United States Patent [19]

Fukase

[11] Patent Number: 5,175,595
[45] Date of Patent: Dec. 29, 1992

[54] NON-CONTACT MEASURING DEVICE
[75] Inventor: Hiroshi Fukase, Mitaka, Japan
[73] Assignee: Tokyo Seimitsu Co., Ltd., Tokyo, Japan
[21] Appl. No.: 733,154
[22] Filed: Jul. 19, 1991
[30] Foreign Application Priority Data Aug. 24, 1990 [JP] Japan .................................. 2-223288

[51] Int. Cl.⁵ .............................................. G01B 11/08
[52] U.S. Cl. .................................... 356/387; 356/386; 250/560
[58] Field of Search ................ 356/384, 385, 386, 387; 250/560, 201.2, 201.4

[56] References Cited
FOREIGN PATENT DOCUMENTS 58-179302 10/1983 Japan .
234306 10/1986 Japan ................................... 356/386
62-168413 10/1987 Japan .
62-250303 10/1987 Japan .
62-254003 11/1987 Japan .
289812 11/1990 Japan ................................ 250/201.2

Primary Examiner—F. L. Evans
Attorney, Agent, or Firm—Sixbey, Friedman, Leedom & Ferguson

[57] ABSTRACT

A non-contact measuring device which applies a scanning light moving parallel at a constant speed to an object to be measured and measures the shape of the object to be measured in accordance with the time for which the scanning light is shut off by the object to measured. To provide the scanning light, light generated from a source of light is allowed to enter through a lens a polygonal mirror rotating at a constant speed and the light reflected by the polygonal mirror is allowed to enter a collimator lens. And, it is necessary that the scanning light be focused at the position of the object to be measured. In the non-contact measuring device, a distance between the light source and lens can be adjusted by adjust means according to the position of the object to be measured and the light allowed to enter the collimator lens can be diverged or converged, so that the light can always be focused at the position of the object to be measured.

3 Claims, 3 Drawing Sheets

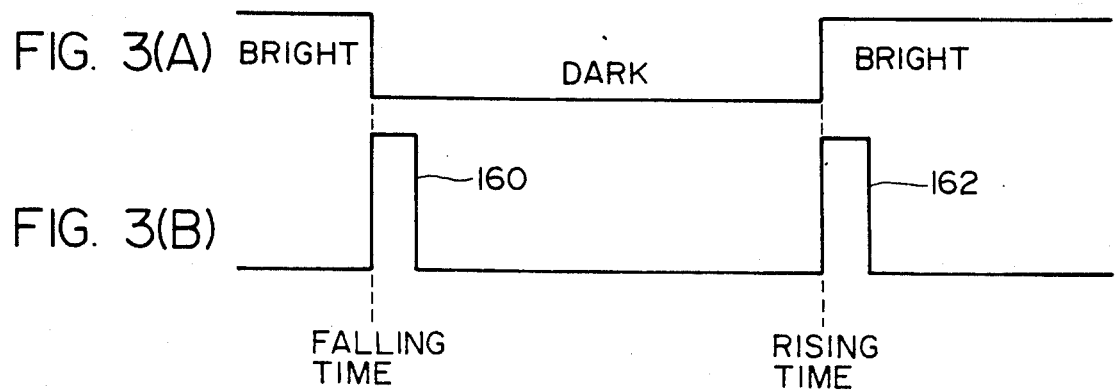
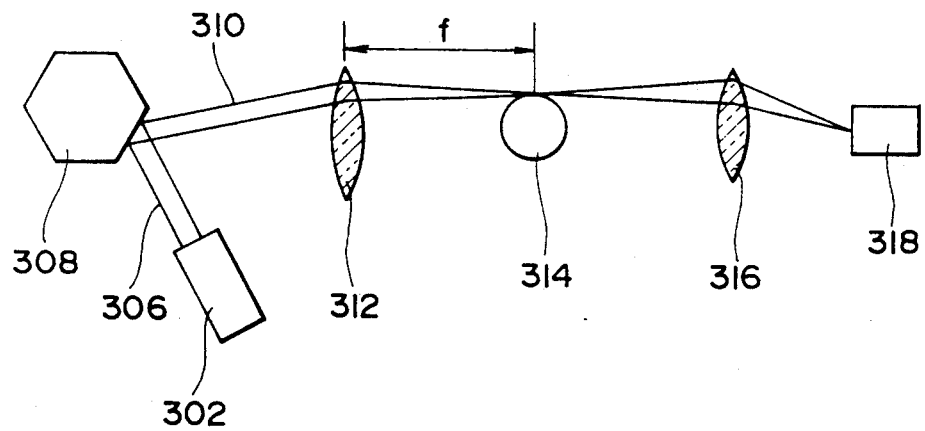

NON-CONTACT MEASURING DEVICE

BACKGROUND OF THE INVENTION

1. Field of the Invention

The present invention relates to a non-contact measuring device and, in particular, to a non-contact measuring device which, in accordance with scanning by use of a laser light or the like, measures the outer dimensions of objects to be measured (that is, works) which are delivered continuously from a conveyor or the like.

2. Description of the Related Art

In non-contact measuring devices according to the prior art, there is known a non-contact measuring device in which an object to be measured is interposed between a laser light projecting part and a laser light receiving part and the outer diameter and other dimensions of the object to be measured are measured in accordance with scanning by use of a laser light.

In the above-mentioned prior art non-contact measuring device, as shown in FIG. 4, a laser light generated from a semiconductor laser 302 is turned into a parallel light of radiation 306 bymeans of a lens disposed within the semiconductor laser 302, and the parallel light 306 is then reflected by a polygonal mirror 308 which rotates at a constant speed. The parallel light 310 is then refracted by a collimator lens 312 and is focused on the center line of an object to be measured 314 and at the focal distance of the collimator lens 312. Also, the beam refracted by the collimator lens 312 becomes a parallel light parallel to the optical axis of the collimator lens 312 and is then guided through a light receiving lens 316 to a light receiving element 318. For this reason, if a scanning area is scanned one time by use of the parallel light, then the diameter and other dimensions of the object to be measured 314 within the scanning area.

In this manner, in the conventional non-contact measuring device, a distance between the collimator 312 and the object to be measured 314 is set at the same distance as the focal distance f of the collimator lens 312.

However, when the conventional non-contact measuring device is used in various types of conveyors and the like, the distance f between the collimator lens and the object to be measured must be changed before it is used.

In this case, because the currently used collimator lens must be replaced by another collimator lens having a different focal distance f, various kinds of expensive collimator lenses must be prepared previously.

SUMMARY OF THE INVENTION

The present invention aims at eliminating the drawbacks found in the above-mentioned prior art non-contact measuring device.

Accordingly, it is an object of the invention to provide a non-contact measuring device which is capable of varying a distance between a collimator lens and an object to be measured without replacing one collimator lens with another.

In order to achieve the above object, according to the invention, there is provided a non-contact measuring device in which light generated from a source of light is allowed to enter a polygonal mirror rotating at a constant speed via a lens, the light that is reflected by the polygonal mirror is then allowed to enter a collimator lens to thereby turn the light into a scanning light movable in parallel to the optical axis of the collimator lens and to allow the light to be focused at the position of an object to be measured, and the shape of the object to be measured can be measured in accordance with an electric signal from a light receiving element which receives the scanning light through a light receiving lens, characterized by control means capable of varying a distance between the source of light and lens so as to enable the light from the collimator lens to be focused at the position of the object to be measured spaced a desired distance apart from the collimator lens.

According to the invention, due to provision of the control means capable of varying the distance between the source of light and lens, the source of light can be moved to nearer or farther positions than the focal distance of the collimator lens. For this reason, the light generated from the source of light is allowed to enter through the lens and polygonal mirror to the collimator lens, the light can be turned into a convergent light or a divergent light, so that the focusing position of the light leaving from the collimator lens can be changed to other positions than the focusing position of the collimator lens.

BRIEF DESCRIPTION OF THE DRAWINGS

The exact nature of this invention, as well as other objects and advantages thereof, will be readily apparent from consideration of the followings specification relating to the accompanying drawings, in which like reference characters designate the same or similar parts throughout the figures thereof and wherein:

FIGS. 3 (A) and (B) are respectively wave form charts of signals ourput from a light receiver and an edge detector; and, FIG. 4 is an enlarged view of the main portions of a non-contact measuring device according to the prior art.

DESCRIPTION OF THE PREFERRED EMBODIMENTS

Detailed description will hereunder be given of the preferred embodiment of a non-contact measuring device according to the present invention with referencce to the accompanying drawings.

Figure 1:
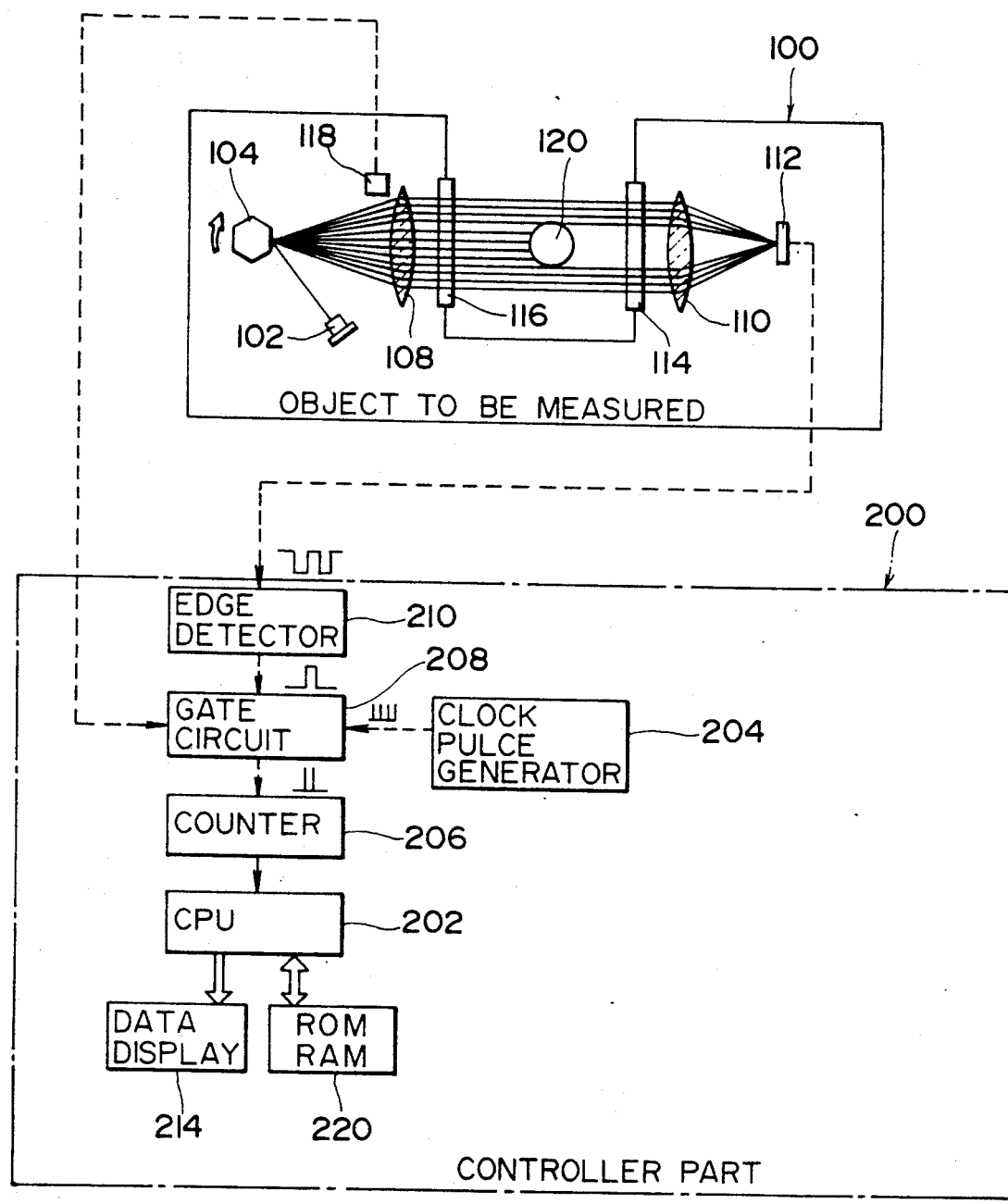
FIG. 1 is a view of the whole of the structure of an embodiment of a non-contact measuring device according to the invention.

Referring first to FIG. 1, there is shown a structure view of the whole of a non-contact measuring device according to the invention. As shown in FIG. 1, the non-contact measuring device includes a measuring part 100 and a controller part 200. And, the measuring part 100 consists mainly of light projection means comprising a light generating section 102, a polygonal mirror 104, a collimator lens 108 and the like, and light receiving means comprising a light receiving lens 110, a light receiving element and the like.

The laser light that is generated from a semiconductor laser light source 140 (see FIG. 2) in the light generating section 102 is reflected by the polygonal mirror 104 rotating at a constant speed, and is then turned into a parallel light and projected by the collimator lens 108. That is, the light projection means projects the laser light in such a manner that a given scanning area can be scanned once over each of the surfaces of the polygonal mirror 104.

Figure 2:
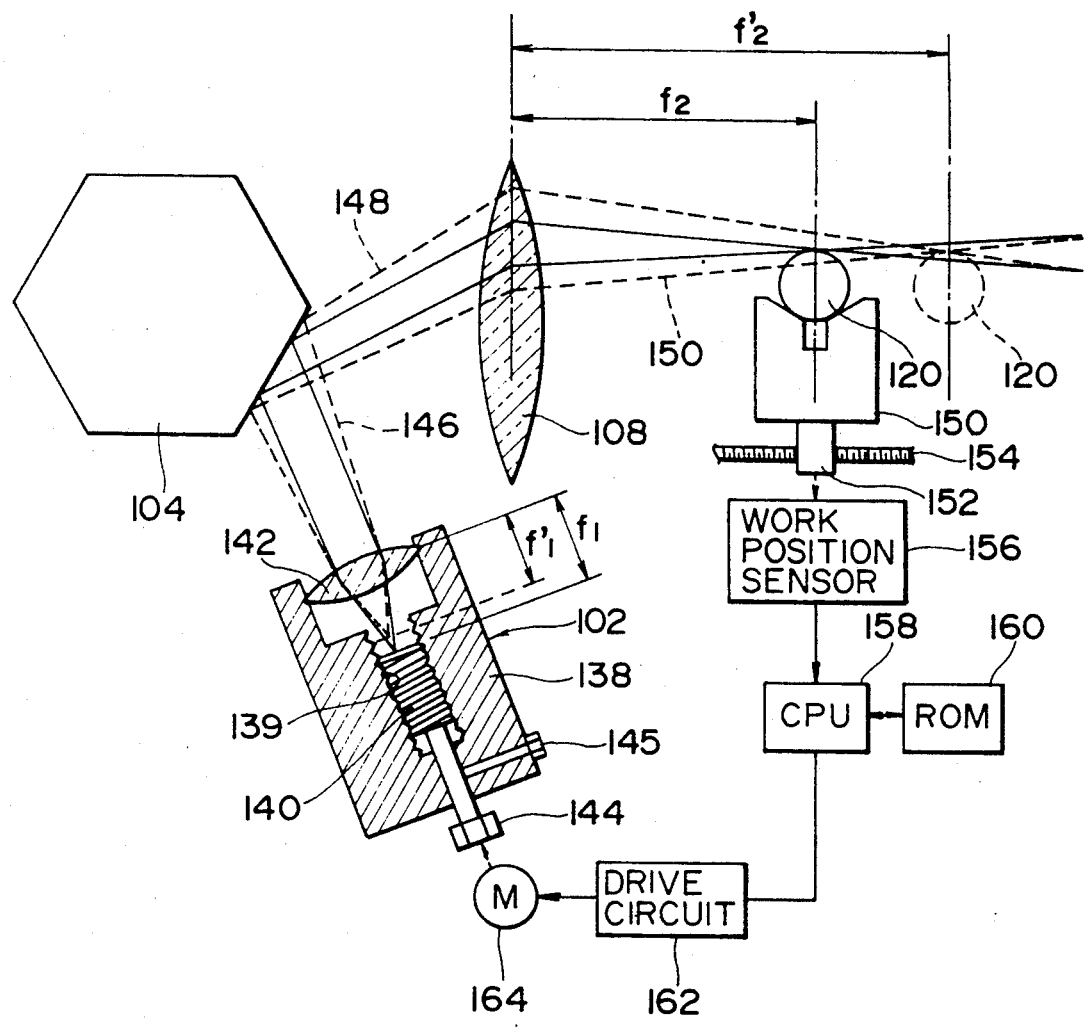
FIG. 2 is an enlarged view of the main portions of the embodiment shown in FIG. 1.

The light generating section 102, as shown in FIG. 2, comprises a case 138, a semiconductor laser light source 140, a convex lens 142 and the like, and the convex lens 142 is fixed in a recess formed in the case 138. And, on the optical axis of the convex lens 142, the semiconductor laser light source 140 is threadedly engaged with the case 138 by means of a threadedly connecting portion 139, and an adjust pin 144 is fixedly secured to the rear portion of the semiconductor laser light source 140. Therefore, if the adjust pin 144 is rotated, then the semiconductor laser light source 140 is moved toward the optical axis of the convex lens 142. Also, in FIG. 2, reference numeral 146 designates a lock screw 145 which can be used to lock the adjust pin 144.

In the light generating section 102, when the semiconductor laser light source 140 is disposed forwardly of the focal distance $f_1$ of the convex lens 142, then the laser light generated from the semiconductor laser light source 140 will not be turned into a parallel light even if it is refracted by the convex lens 142 but it will be turned into a divergent light which will be in turn reflected by the polygonal mirror 104. For this reason, the light reflected by the polygonal mirror 104 will also become a divergent light 148 which will be in turn allowed to enter the collimator lens 108.

The thus entered light is refracted by the collimator lens 108 and the refracted light 150 will be focused at the position of $f'_2$. The $f'_2$ position is farther than the focal distance $f_2$ of the collimator lens 108 from the collimator lens 108. For this reason, the distance between the collimator lens 108 and the object to be measured 120 can be increased.

As described above, the laser light focused at the $f'_2$ position, as shown in FIG. 1, is collected through the light receiving lens on to the light receiving element 112, in which it is converted photo-electrically. For this reason, if the object to be measured (work) 120 is situated in a given scanning area, then the laser light is shut off according to the outside shape of the work 120 and an electric signal corresponding to the brightnesses of light is output from the light receiving element 112. Here, in FIG. 1, reference numerals 114 and 116 designate glass windows for lens protection, respectively, and 118 stands for a synchronizing light receiving element which outputs a signal every scanning.

Now, referring to the controller part 200 shown in FIG. 1, it consists mainly of a central processing unit (CPU) 202, a clock pulse generator 204, a counter 206, a gate circuit 208, an edge detector 210, a memory device 220 and the like.

The controller part 200 measures the dimensions of the work 120 by calculating the length of a time during which tha shade of the laser light used to scan the work is existing in accordance with the electric signal given by the light receiving element 112.

In other words, the edge detector 210 detects the falling and rising times of an electrical signal (FIG. 3(A)) which is applied by the light receiving element 112 and corresponds to the brightnesses of the light, and outputs to the gate circuit 208 a pulse signal which provides rectangular waveforms 160, 162, as shown in FIG. 3(B).

When the first pulse signal is applied from the edge detector 210 after the signal is given by the synchronizing light receiving element 118, then the gate circuit 208 open its gate and it closes the gate when the next pulse signal is applied. The clock pulse generator 204 outputs a high speed clock pulse to the gate circuit 208, and the counter 206 counts the number of the clock pulses that have passed through the gate circuit 208 and outputs to the CPU 202 a signal indicating the value counted. The CPU 202 operates the length of the time of existence of the shade of the work 120 in accordance with the count value of the counter 206 to thereby measure the dimensions (outside diameter) of the work 120. Here, it should be noted here that, because the laser light scans the work 120 at a constant speed, the time length of the shade of the work 120 corresponds to the outside diameter of the work 120. Also, the outside diameter of the work 120 is measured for each of the surfaces of the polygonal mirror 104, that is, tha work outside diameter is measured for every one scanning. Normally, however, a plurality and preset number of measurements are carried out and then the average value of the measurements are taken for enhancement of measuring accuracy.

Next, description will be given below in detail of a device for automatically controlling the distance between the collimator lens 108 and work 120.

As shown in FIG. 2, if the laser light is generated from the semiconductor laser light source 140, then the laser light is refracted by the convex lens 142 and turned into a divergent light 146 which is in turn reflected by the polygonal mirror 104. The reflected light becomes a divergent light 148 and enters the collimator lens 108, and the divergent light is refracted by the collimator lens 108 and is focused at the $f'_2$ position. Since the work 120 is placed at the $f'_2$ position, the laser light can be shut off according to the outside shape of the work 120.

In the above-mentioned embodiment, description was given of the fact that the distance between the collimator lens 108 and work 120 can be greater than the focal distance $f_2$ of the collimator lens 108. On the other hand, the distance between the collimator lens 108 and work 120 can also be set smaller than the focal length $f_2$ of the collimator lens 108 by moving the semiconductor laser light source 140 to a position in the rear of the focal distance $f_1$ of the convex lens 142 to thereby turn the leaving light from the convex lens 142 into a convergent light.

Next, description will be given below of adjustments of the position of the semiconductor laser light source 140 with the change of the position of the work 120.

A work table 150 to carry the work 120 thereon can be moved by a ball nut 152 and a ball screw 154. Therefore, by rotating the ball screw 154 by use of a handle (not shown), the position of the work 120 can be changed.

The position of the work 120 is detected by a work position sensor 156 which detects the position of the work table 150 or the amount of rotation of the ball screw 154, and the work position sensor 156 outputs a signal indicating the position of the work 120 to the CPU 158.

On the other hand, the position at which the laser light is focused through the collimator lens 108 can be adjusted by rotating the adjust pin 144. There is a fixed relationship between the rotational position of the adjust pinh 144 and the focusing position of the laser light. A table showing a relationship between the work position and the rotational position of the adjust pin 144 for allowing the laser light to be focused at the work position has previously stored in a memory circuit 160.

The CPU 158, in accordance with a signal applied from the work position sensor 156 and indicating the work position, reads out from the memory circuit 160 the data that shows the rotational position of the adjust pin 144 corresponding to the work position. In accordance with the data read out, the CPU 158 then drives a motor 164 by means of a drive circuit 162 to rotate the motor 164 so that the rotational position of the adjust pin 144 can correspond to the work position.

In this manner, when the position of the work 120 is moved, then the position of the semiconductor laser light source 140 can be automatically adjusted in such a manner that the laser light can be focused at the thus moved position.

In the above-mentioned embodiment, the distance between the semiconductor laser light source 140 and convex lens 142 is changed by moving the semiconductor laser light source 140. However, the invention is not limited to this, but the distance can also be changed by moving the convex lens 142. Also, although the above-mentioned embodiment employs a single convex lens 142, a plurality of lenses can be combined together.

In the above embodiment, description was given of the semiconductor laser light. However, this is not limitative, but, for example, a helium neon light or the like can be applied similarly. Also, in the case of the laser light, the laser light is refracted by the convex lens 142. However, if a light generated from a light source is a parallel light, then a concave lens may be used to turn the parallel light into a divergent light.

As has been described heretofore, according to a non-contact measuring device of the invention, the distance between the collimator lens and the object to be measured can be changed without replacing the collimator lens with another. Thus, because there is eliminated the need to replace the collimator lens with a new one each time the distance between the collimator lens and the object to be measured, it is not necessary to previously prepare various kinds of expensive collimator lenses.

It should understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A non-contact measuring device in which a semiconductor laser light source that is constructed and arranged for generating light and for directing the light generated through a focus distance adjusting lens to a polygonal mirror rotating at a constant speed, a collimator lens that is constructed and arranged for receiving light reflected by the polygonal mirror and for converting the reflected light into a scanning light moving parallel with an optical axis of the collimator lens and focused at a position at which an object to be measured is located, and means for measuring the shape of the object to be measured in accordance with an electric signal given from a light receiving element which receives the scanning light via a light receiving lens, said non-contact measuring device comprising:

adjusting means capable of varying a distance between said semiconductor laser light source and said focus distance adjusting lens so as to enable said scanning light to be focused at the position of said object to be measured, spaced a desired distance from said collimator lens;

detector means for detecting the position of said object to be measured; and, control means for controlling said adjusting means in accordance with the output of said detector means, so that said scanning light can be focused at the position of said object to be measured.

2. The non-contact measuring device as set forth in claim 1, wherein said adjusting means comprises:

a case for holding said focus distance adjusting lens; a threadable coupling portion formed on an outer periphery of said semiconductor laser light source and on an inner periphery of said case and being capable of varying a distance between said semiconductor laser light source and said focus distance adjusting lens when said semiconductor laser light source and said case are rotated relatively to each other; and a motor for rotating said semiconductor laser light source and said case relative to each other.

3. The non-contact measuring device as set forth in claim 2, wherin said control means includes storing means for storing a desirable relationship between a measuring position of said object to be measured and the relative rotational position between said semiconductor laser light source and said case for allowing the laser light emitted from said semiconductor laser light source to be focused at said desirable measuring position, and said control means being operable for reading out a rotational position corresponding to a measuring position of said object detected by said detecting means from said storing means on the basis of the stored desirable relationship and controlling said motor for bringing the relative rotational position between said semiconductor laser light source and said case to the rotational position read out.

* * * * *